Figure 1:
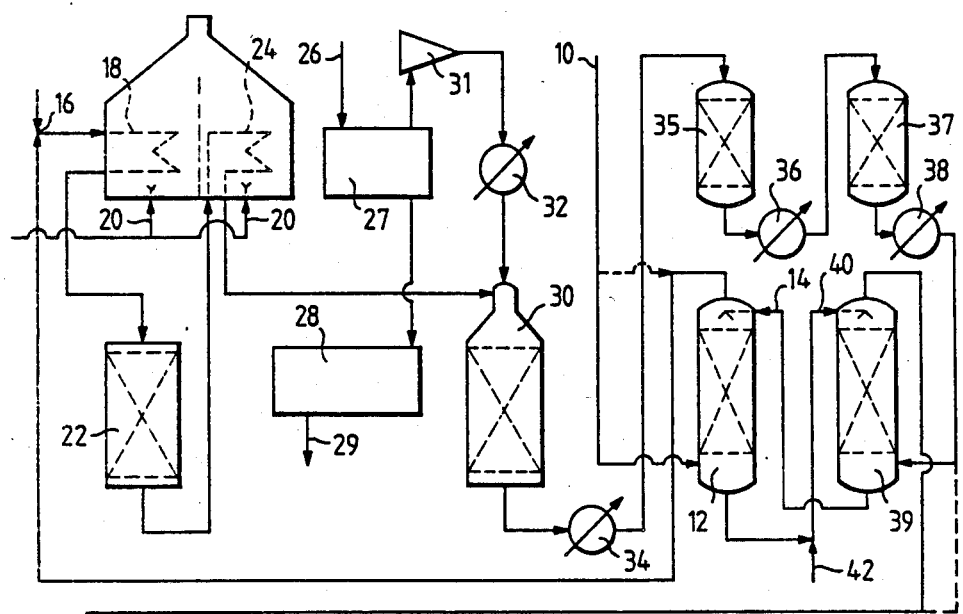
Figure 1:
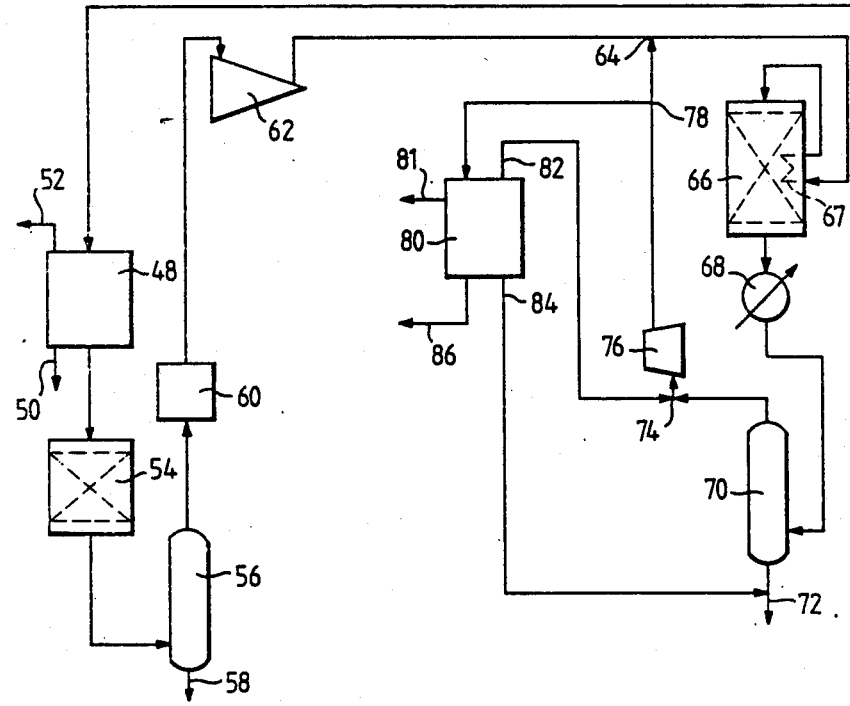

United States Patent [19]

Pinto

[11] Patent Number: 4,681,745

[45] Date of Patent: Jul. 21, 1987

[54] AMMONIA PRODUCTION PROCESS

[75] Inventor: Alwyn Pinto, Linthorpe, England

[73] Assignee: Imperial Chemical Industries PLC, London, England

[21] Appl. No.: 732,263

[22] Filed: May 9, 1985

Related U.S. Application Data

[63] Continuation of Ser. No. 482,224, Apr. 5, 1983, abandoned.

[30] Foreign Application Priority Data

Apr. 14, 1982 [GB] United Kingdom ................ 8210834
Apr. 14, 1982 [GB] United Kingdom ................ 8210835

[51] Int. Cl.$^4$ ............................................. C01C 1/04
[52] U.S. Cl. ................................................. 423/359
[58] Field of Search .................. 423/359, 36, 360, 361

[56] References Cited

U.S. PATENT DOCUMENTS

| 3,081,268 | 9/1964 | Marshall, Jr. | 423/359 |
| 3,278,452 | 10/1966 | Vorum | 252/376 |
| 3,442,613 | 5/1969 | Grotz, Jr. | 423/359 |
| 3,743,488 | 7/1973 | Bogart | 423/359 |
| 3,795,485 | 3/1974 | Bogart | 423/359 |
| 4,213,954 | 9/1984 | Pinto | 423/359 |
| 4,296,085 | 10/1981 | Banquy | 423/359 |
| 4,298,588 | 11/1981 | Pinto | 423/359 |
| 4,318,782 | 9/1984 | Pagani et al. | 423/359 |
| 4,376,758 | 9/1984 | Pagani et al. | 423/359 |
| 4,383,982 | 5/1983 | Pinto | 423/359 |

FOREIGN PATENT DOCUMENTS

| 0058531 | 6/1981 | European Pat. Off. |  |
| 1133608 | 9/1984 | France | 423/359 |
| 1555826 | 11/1979 | United Kingdom | 423/359 |
| 2028786 | 3/1980 | United Kingdom |  |

OTHER PUBLICATIONS

Kirk-Othmer's Encyclopedia of Chemical Technology, 3rd Ed., vol. 15, pp. 935-937.
G. E. Hays and F. L. Poska, "Ammonia Synthesis Plant Kinetics", *Chemical Engineering Progress*, vol. 60, No. 1 (Jan. 1964), pp. 61-65.
Anders Nielsen, *An Investigation on Promoted Iron Catalysts for the Synthesis of Ammonia*, Third Edition, Jul. Gjellerups Forlag (1968), pp. 64-71.
New Ammonia Process Reduces Costs, J. G. Livingstone, A. Pinto, Nov. 14-18, 1982.
"High Purity Nitrogen Plants", leaflet PD 38/6, 78a (Petrocarbon Developments Ltd.).
Knoblauch, Chemical Engineering, Nov. 6, 1978, pp. 87-89.
Colby et al (23rd Symposium on Safety in Ammonia Plants and Related Facilities, Am. Inst. Chem. Engrs. Conf. Miami, Nov. 1978).
Bonacci et al (Am. Inst. Chem. Engrs. Symposium, Denver, Aug. 1977).

*Primary Examiner*—John Doll
*Assistant Examiner*—Wayne A. Langel
*Attorney, Agent, or Firm*—Cushman, Darby & Cushman

[57] ABSTRACT

Production of ammonia by the sequence of steam hydrocarbon primary reforming, secondary reforming with air, carbon monoxide shift conversion, carbon oxides removal and catalytic ammonia synthesis is improved by using oxygen-enriched air at secondary reforming and/or by operating the reforming steps so that 5-15% by carbon atoms of the starting hydrocarbon is not reformed but is purged from the synthesis. The oxygen enriched air can be the by-product of a simple air separation plant producing nitrogen, and the nitrogen can be used to aid start-up or shut-down of the process or to keep the process plant in a hot stand-by condition.

7 Claims, 2 Drawing Figures

AMMONIA PRODUCTION PROCESS

This is a continuation of application Ser. No. 482,224, filed Apr. 5, 1983 now abandoned.

This invention relates to an ammonia production process, in particular to such a process capable of operation at a relatively low rate of energy consumption per unit quantity of product.

A typical ammonia production process comprises
(a) primary catalytically reforming at superatmospheric pressure a hydrocarbon feedstock with steam to give a gas containing carbon oxides, hydrogen and methane;
(b) secondary catalytically reforming the gas from step (a) by introducing air and bringing the mixture towards equilibrium, whereby to produce a gas containing nitrogen, carbon oxides, hydrogen and a decreased quantity of methane;
(c) converting carbon monoxide catalytically with steam to carbon dioxide and hydrogen;
(d) removing carbon oxides to give a nitrogen-hydrogen ammonia synthesis gas;
(e) reacting the synthesis gas to produce ammonia and recovering ammonia from the reacted gas; and
(f) discarding non-reactive gases present in the synthesis gas.

Our European published application 993 describes such a process in which energy input is decreased by:
(i) operating step (a) in conditions of steam-to-carbon ratio, pressure and temperature to produce a gas containing at least 10% v/v methane and using in step (b) a quantity of air in excess of what would introduce 1 molecule of nitrogen per 3 molecules of hydrogen; and
(ii) treating synthesis gas after reaction to synthesise ammonia to separate a stream enriched in hydrogen and returning the enriched stream to the synthesis.

In our European application 49967, published Apr. 21, 1982, a process comprising steps (a) to (f) and (i) to (ii) above is described having the features of
X. controlling the rate of flow of the stream enriched in hydrogen so that the hydrogen to nitrogen molar ratio of the gas entering the synthesis catalyst is in the range 1.0 to 2.5; and
Y. operating step (a) in at least one adiabatic catalyst bed and providing the endothermic heat of reaction by preheating, whereby the temperature of the reacting gas falls as it proceeds through the catalyst bed.

According to the first aspect of the invention an ammonia production process comprises steps (a) to (f) above and is characterised by using in step (b) air enriched with oxygen up to an oxygen content not over 50% v/v. The oxygen enrichment is moderate and, except in a process involving carbon oxides removal as methanol, does not introduce less than 1 molecule of nitrogen per 3 molecules of hydrogen. Preferably it introduces an excess of nitrogen, such that after steps (c) and (d) there are 2.0 to 2.9, especially 2.2 to 2.8, molecules of hydrogen per molecule of nitrogen.

It has been generally considered that, as a process for producing ammonia synthesis gas, steam hydrocarbon reforming is preferable to hydrocarbon partial oxidation because it does not require an air separation plant and because it converts feedstock to a gas containing a higher proportion of hydrogen to carbon oxides. However, the thermal efficiency of the hydrocarbon steam reaction heated by internal combustion can be higher than when heated externally and operation at higher pressure is made easier by reacting more hydrocarbon in the secondary reformer (that is, by internal combustion) and less in the primary reformer. We have now realised that these advantages can be obtained by using in a steam reforming system enriched air produced in an air separation plant much simpler than that used in making substantially pure oxygen. Various other advantages will be described.

The oxygen content of the enriched air is preferably over 25% v/v for example in the range 30–45, especially 30–40% v/v. Such a mixture is conveniently the by-product stream from a process designed primarily to produce pure nitrogen. One such process comprises compressing air, cooling it, fractionating it in a single stage to give nitrogen overhead and an oxygen enriched mixture as bottoms and expanding the nitrogen and the mixture to cool the inlet compressed air. The working pressure of such a process is typically in the range 5–10 bar abs. The nitrogen can be recovered as liquid or gas and can be used in the ammonia production process in ways described below. The oxygen-containing mixture can be delivered at the working pressue or less, but usually will require compression since secondary reforming is carried out preferably at a pressure higher than that used for the air separation. Suitable processes are described in KirkOthmer's Encyclopedia of Chemical Technology, 3rd Edition, vol. 15, pages 935–936 and in "High purity nitrogen plants", leaflet PD 38/6, 78a issued by Petrocarbon Developments Ltd.

Another such process is a selective adsorption system. This can use a zeolite, by which nitrogen is preferentially adsorbed from air, or a carbon adsorbent, by which oxygen is adsorbed more rapidly than nitrogen, a nitrogen stream is passed out and an oxygen-enriched mixture (typically 35% $O_2$, 65% $N_2$) is obtained by desorption. A process of this type is described by Knoblauch in Chemical Engineering, Nov. 6, 1978, 87–89.

Other processes such as membrane diffusion can be used, if desired.

When the oxygen enriched air is produced from such a preferred process the nitrogen product is preferably stored, for injection into the ammonia production plant in start-up, stand-by or shut down phases, in particular for purposes such as a catalyst heating medium during start-up, a flushing or circulating gas during periods of interrupted production when the plant is to be kept hot and ready for rapidly restarting production, a blanketing gas during catalyst shut down or waiting periods and a dilution gas during catalyst activation by reduction. The combination of such a nitrogen and enriched-air production step with a process involving steps (a) to (f) is thus a technological unity. If nitrogen storage facilities are filled, nitrogen can be vented to atmosphere, possibly with cold recovery in the ammonia recovery section of the production process and/or with changed operation of air separation so as to deliver oxygen-enriched air at increased pressure. Addition of some nitrogen further downstream, for example to the gas after carbon oxides removal or to circulating synthesis gas or purge gas is not excluded, but not usually necessary.

As a result of using oxygen-enriched air at step (b) the following preferred modes of operation become practicable:

I. If step (a) employs preheating followed by adiabatic endothermic reaction, fewer such stages, preferably one only, can be used;

II. If the hydrocarbon feedstock contains more than 2 carbon atoms, step (a) can be of the preheat/adiabatic type known as "CRG";

(Modes I and II are especially preferred because they make the conventional reforming furnace unnecessary).

III. If step (a) uses externally heated catalyst beds, the outlet methane content can be higher and a higher pressure, lower steam ratio or lower temperature used;

IV. The nitrogen excess can be less and thus the size of the side stream from which hydrogen is recovered after synthesis can be less;

V. Since the air separation step includes or readily can include removal of water and corrosive impurities, any compressor used to introduce enriched air in step (b) need not include a cooler and water separator: thus the isentropic heat of compression is made use of in preheatng the enriched air;

VI. The synthesis gas generation pressure can be high enough to permit removal of excess nitrogen, or some of it, before the fresh synthesis gas enters the ammonia synthesis loop;

VII. Part of the synthesis gas can be used for methanol synthesis without resulting in an ammonia synthesis gas excessively rich in nitrogen.

In addition, if step (b) includes selective oxidation of carbon monoxide, this can use the enriched air and then involves a smaller introduction of nitrogen than when air is used as the oxide.

The invention is especially useful when step (a) is carried out by preheating the reactants and then allowing them to react in one or more adiabatic catalyst beds. This arises from I or II above, but also from the possibility of starting up the whole plant rapidly or shutting it down hot under nitrogen according to the demand for ammonia. This has not been possible using the conventional purity reforming furnace because such a furnace, a brick-lined box, can be heated or cooled only very slowly, and thus it has been preferred to continue operation and put ammonia into store, rather than to cool the furnace. In principle rapid start-up or shut down would be possible using the process of our European application 49967 or the Fluor process (U.S. Pat. Nos. 3743488, 3795485), but has been thought uneconomic in the absence of an on-site nitrogen supply. If desired, the air separation plant can be operated without the other steps in ammonia production, for example during start-up or during a waiting period after stored nitrogen has been used up, to provide the required nitrogen. In such events the oxygen-enriched air is stored or disposed of.

The pressure at which steps (a) to (d) are operated is preferably at least 10 bar abs. and especially at least 30 bar abs. to make most advantageous use of the oxygen-enriched air. The upper limit is likely to be 120, conveniently 80 bar abs. Such pressures apply to the outlet of step (a), and the pressures at subsequent steps are lower as the result of resistance to gas flow in reactors and pipes. In or after step (d), or possibly before a methanation stage forming the last stage of step (d), the gas is compressed if its pressure is not high enough for ammonia synthesis. The extent of such compression is preferably not more than by 20-80 bar, and can be by as little as 25% or less such as occurs in a synthesis gas circulating pump. When compression is by such a preferred limited extent, it is preferred to remove excess nitrogen from synthesis gas after ammonia synthesis.

The power for the compressors in the air separation plant, for secondary reformer air feed and for synthesis gas, and for various pumps and other machinery, is conveniently derived from engines driven by steam produced in heat recovery from hot gases in the process. If desired such power drives can be partly or wholly electrical.

Step (a) is carried out at an outlet temperature under 800° C., preferably much lower, for example in the range 450°-650° C. As a result, in an externally heated tubular catalyst system the life of the tubes can be very long, even at the higher pressures specified above. More conveniently step (a) is carried out by preheating followed by adiabatic reaction, in mode I or II mentioned above. A catalyst having adequate low temperature activity should be used, such as co-precipitated nickel-/alumina "CRG" catalyst or a catalyst comprising an active metal on an oxidic secondary support on a metal or alloy or highly calcined ceramic primary support as described in European published applications 21736 or 45126 respectively. Because the secondary reformer, fed with oxygen-enriched air, can react substantial quantities of methane without introducing too great an excess of nitrogen, the outlet methane content of step (a) can be in the range 40-80% v/v on a dry basis: in effect step (a) is acting thus as a "chemical preheater" for the reactants of step (b). The steam to carbon molar ratio in step (a) is typically in the range 2.5 to 8.0, the higher ratios being used at higher pressures in the specified range.

The preheater for the primary reforming step or steps is preferably a pressurised furnace. The pressure of the gases brought into heat exchange with the reactants is suitably at least 5 bar abs and preferably within 30 bar abs of the pressure of the reactants. By this means the life of the tubes through which the reactants flow in the furnace can be very usefully lengthened and/or the tubes can be made of thinner or cheaper metal. If the heating fluid is combustion gas a useful energy recovery as expansion engine power and waste heat is possible. The heating fluid can be at a pressure dictated by its source, for example it may be helium heated in a nuclear reactor. If desired it can be combustion gas from a solid fuel, especially if combusted in a fluidised bed. Conveniently it is secondary reformer outlet gas.

Whether pressurised or not, the heating fluid after leaving the heat exchange surfaces is passed in heat exchange with one or more fluids such as saturated steam, process air, boiling water, boiler feed water, hydrocarbon feed or combustion air, in decreasing order of grade of heat recovery.

Step (b) is normally carried out in an adiabatic reactor over a refractory-supported Ni or Co catalyst. The primary reformer gas fed to it can be further preheated or can contain added steam or hydrocarbon. The oxygen enriched air is fed at a temperature preferably in the range 400°-800° C. preferably at least partly as the result of using a compressor with limited, if any, cooling. The outlet temperature of step (b) is preferably in the range 800°-950° C. The outlet methane content is preferably in the range 0.2 to 1.0% on a dry basis but can be greater, for example up to 3.0%, if it is desired not to introduce too much nitrogen and if provision is made to utilise the fuel value of the methane in the non-reactive gas discarded in step (f), as in the process of the second aspect of the invention described below or in our co-pending European application 49967.

The gas leaving step (b) can if desired be used as the source of heat for step (a). Very usefully it can be cooled with recovery of heat in ways similar to those applied to preheater heating fluid, except that heat exchange with air is usually avoided for reasons of safety, and that cooling is not below carbon monoxide shift conversion inlet temperature. In conventional processing this temperature is in the range 300°-400° C., especially 320°-350° C., for "high temperature shift", usually over an iron-chrome catalyst. The outlet temperature is typically in the range 400°-450° C., whereafter the gas is cooled with heat recovery as above to 200°-240° C. and passed to low temperature shift over a coppr-containing catalyst at an outlet temperature in the range 240°-270° C. The final CO content is up to 0.5% v/v on a dry basis, and can be followed by methanation.

As an alternative to such processing the secondary reformer gas can be cooled to 250°-325° C., with appropriately greater recovery of heat, and passed to shift at an outlet temperature up to 400° C., especially up to 350° C. This results in a higher final CO content (up to 2.0% v/v on a dry basis) than low temperature shift, but is preferable at higher pressures (over 30 bar abs) because there is less risk of condensation of steam on the catalyst. The catalyst can be supported copper, suitably with zinc oxide and one or more refractory oxides such as alumina.

If the alternative shift is used it is preferred to remove carbon monoxide finally by cooling and water removal, then selective oxidation. The selective oxidation catalyst is suitably supported platinum (0.01 to 2.0% w/w) containing possibly one or more of manganese, iron, cobalt or nickel as a promoter. A description of a suitable selective oxidation process is given in UK 1555826 and in the articles by Colby et al (23rd Symposium on safety in ammonia plants and relates facilities, Am. Inst. Chem. Engrs. Conv., Miami, November 1978) and Bonacci et al. (Am. Inst. Chem. Engrs. Symposium, Denver, August 1977).

After low temperature shift or selective oxidation the gas is cooled, water (if still present) is removed from it and the gas is contacted with a regenerable liquid absorbent to remove carbon dioxide. Many processes for doing this are well established and reference is made to our European published application 993 for a survey of them.

The gas now contains a fractional percentage of carbon dioxide and, if produced by low temperature shift, of carbon monoxide. These gases are rendered harmless preferably by methanation, typically using a supported nickel catalyst at an inlet temperature of 250°-350° C. The gas is then cooled and dried and then compressed to synthesis pressure. If desired, it can be compressed before methanation.

The conditions of ammonia synthesis can be generally as described in our European published application 993. As a result of the relatively low synthesis pressure, preferably in the range 40-120 bar abs, the synthesis catalyst outlet temperature is preferably also low, for example in the range 300°-450° C., to obtain a more favourable equilibrium. The catalyst volume is typically 100-200 m$^3$ per 1000 metric tons per day ammonia output, and is chosen preferably to given an ammonia content of 10-15% v/v in reacted synthesis gas. Recovery of ammonia is preferably by condensation using moderate refrigeration, to for example between +2° and −10° C. Separation of the hydrogen-enriched and the methane/nitrogen stream from reacted synthesis gas can be by a cryogenic, adsorptive or diffusion method.

According to the second aspect of the invention an ammonia production process comprises
(a) primary catalytically reforming a hydrocarbon feedstock with steam at superatmospheric pressure and in conditions of steam-to-carbon ratio, pressure and temperature to produce a gas containing carbon oxides, hydrogen and at least 10% v/v of methane on a dry basis;
(b) secondary catalytically reforming the gas from step (a) by introducing air and bringing the mixture towards equilibrium, whereby to produce a gas containing nitrogen, carbon oxides, hydrogen and a decreased quantity of methane, the quantity of air used being in excess of what would introduce 1 molecule of nitrogen per 3 molecules of hydrogen;
(c) converting carbon monoxide catalytically with steam to carbon dioxide and hydrogen;
(d) removing carbon oxides to give fresh nitrogen-hydrogen ammonia synthesis gas;
(e) reacting the synthesis gas to produce ammonia and recovering ammonia from the reacted gas; and
(f) treating synthesis gas after reaction to synthesise ammonia to separate a stream enriched in hydrogen, returning the enriched stream to the synthesis and purging the residual stream after separation of the stream enriched in hydrogen;
and is characterised by
X. controlling the rate of flow of the stream enriched in hydrogen so that the hydrogen to nitrogen molar ratio of the gas entering the synthesis catalyst is in the range 1.0 to 2.5; and
Y. operating step (a) in an externally heated catalyst and operating step (b) to give an outlet methane content such that in step (f) the purged residual stream contains methane amounting to 5-15% by carbons atoms of the hydrocarbon fed to step (a).

A process of this type involving synthesis of ammonia using hydrogen deficient synthesis gas and production of synthesis gas by adiabatic hydrocarbon steam reforming is described in our co-pending European Application 49967 mentioned above. We have now realised that the preferred form of that process in which a small proportion of hydrocarbon is not converted to synthesis gas can be on the basis of an externally heated reforming step operated in advantageous conditions.

The $H_2:N_2$ molar ratio is preferably in the range 1.5 to 2.3 in the gas entering the synthesis catalyst in step (e). Whatever its ratio within the defined broad or preferred range, it is maintained preferably within 20% of the ratio in the fresh synthesis gas produced in step (d). By this means the rate of flow of the hydrogen recovery stream and thus the power consumption are limited.

The required $H_2:N_2$ molar ratio in fresh synthesis gas can be attained without excessive catalyst outlet temperatures provided the steam to carbon ratio in the primary and secondary reforming steps is high enough. To make synthesis gas at a pressure over 30 bar abs, especially in the range 40-80 bar abs, a steam ratio of at least 3 especially in the range 4-8 is preferably used. In the gas leaving step (a) the methane content is preferably in the range 25-35% v/v on a dry basis. The methane content of the gas leaving step (b) is preferably in the range 1.5 to 3% on a dry basis. Such methane contents are substantially higher than have previously been considered suitable for ammonia production. They are specified, however, because it is now realised (1) that the plant for removing excess nitrogen from synthesis gas can also remove methane; (2) the methane finally purged is not wasted but is used as fuel in the reformer furnace. As a result the primary reformer outlet temperature need not be over 750° C. and can be under 700° C. and the secondary outlet temperature need not be over 900°. If desired, step (b) can be fed with oxygen-enriched air, as in the first aspect of the invention. In step (a) the steam/hydrocarbon reaction can take place at an outlet temperature as low as 550°–650° C. Consequently a catalyst having adequate low temperature activity should be chosen. A very suitable catalyst comprises nickel on a refractory secondary support on a metal or alloy primary support, or on a highly calcined ceramic support, as referenced above.

The steps of converting carbon monoxide catalytically with steam and removing carbon dioxides can be conventional as described above in relation to the first aspect of the invention. Especially since it is preferred to operate the primary and secondary reforming steps at relatively low temperatures, resulting in a rather higher methane content than was previously considered suitable for ammonia synthesis gas, it is preferred to remove carbon monoxide finally by selective oxidation. This leaves carbon dioxide in the gas, and this can be removed largely by contact with the liquid absorbent, as disclosed in our European application 993. Residual carbon dioxide can then be removed by methanation or adsorption or treatment with non-regenerable alkali.

The conventional sequence of high temperature and low temperature shift can be used, or a single shift stage as described above. In the single stage the inlet steam-to-gas volume ratio can be at least 0.8 which, with suitable temperature control, enables the outlet CO content to be low enough (up to 0.5% v/v on a dry basis) for final removal by methanation. Alternatively the CO content can be up to 2.0% v/v whereafter it is removed by selective oxidation, as described above.

The conditions of ammonia synthesis can be generally as in the process of the first aspect of the invention.

In the accompanying drawings two flowsheets are set out:

FIG. 1, illustrating the first aspect of the invention; and

Figure 2:
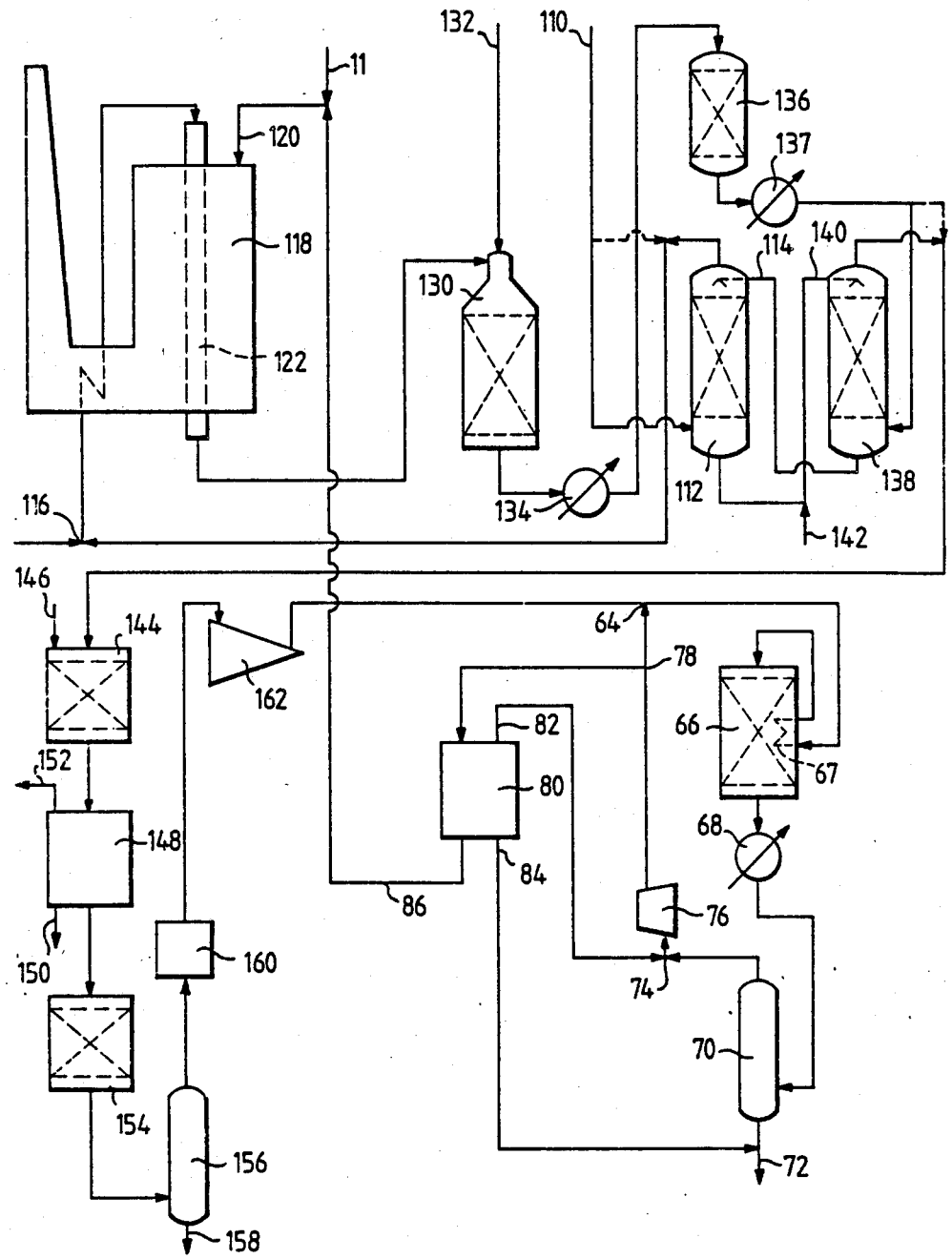

FIG. 2, illustrating the second aspect of the invention.

In the process of FIG. 1, a hydrocarbon feedstock, natural gas, is desulphurised by known means (not shown) and fed at 10 to the lower portion of packed tower 12, in which it rises through a falling stream of hot water fed in at 14 from a source to be described. The resulting water-saturated gas is mixed, if necessary, with steam at 16. (In an alternative process, shown by the dotted line, towers 12 and 39 are not used and all the steam is added as such at 16). The mixture is preheated to 640° C. in furnace 18 fired at 20 with natural gas which, for this purpose, need not be thoroughly, if at all, desulphurised. The heated gas is then passed over a supported nickel catalyst in insulated reactor 22. The endothermic methane/steam reaction

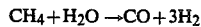
$$CH_4 + H_2O \rightarrow CO + 3H_2$$

takes place and the temperature falls, reaching 523° C. at the catalyst outlet. The resulting gas is then reheated to 700° C. in furnace 24 and passed into secondary reformer 30. Here it encounters a steam of hot oxygen enriched air (32% v/v $O_2$, 600° C.) derived from air separation plant 27 in which a feed of compressed air 26 is resolved into a substantially pure nitrogen stream sent to storage 28 and an enriched air stream which is compressed at 31 and further heated at 32. The use of nitrogen stream 29 will be referred to below. In secondary reformer 30 the temperature rises initially as hydrogen burns with a flame, but over the catalyst further methane/steam reaction takes place and the temperature falls to 924° C. at the catalyst bed outlet. The temperature and rate of feed of enriched air are chosen so that the gas leaving 30 contains nitrogen in excess of what can react later with hydrogen to produce ammonia. Furnaces 18 and 28 can include flue gas heat recoveries such as expansion turbines, combustion air preheaters and boiler feed water heaters but for the sake of clarity these are not shown.

Gas leaving secondary reformer 30 is cooled at 34, which represents heat recovery by high pressure steam generation and one or more of boiler feed water heating and natural gas preheating. The cooled gas, now at about 370° C., is passed into high temperature shift reactor 35 and there it reacts exothermally over an iron chrome catalyst. It is then cooled in heat exchange 36, which usually includes a high pressure boiler and feed water heater, then passed into low temperature shift reactor 37, in which it contacts a copper containing catalyst and its carbon monoxide is almost completely reacted. The shifted gas is cooled with low grade heat recovery at 38 and contacted with water in packed tower 39, in which it becomes cooled and depleted of part of its content of steam. The resulting heated water is passed at 14 in to tower 12 already mentioned. The cool water fed to toward 39 at 40 is derived in part from tower 12 in which heated water from the bottom of tower 39 is cooled by evaporation and partly from supplementary water fed in at 42 from external supplies or from point 50 or 58 to be described.

Water-depleted gas leaving tower 39 overhead is passed to cooling, water removal and $CO_2$ removal units, which are conventional and are indicated generally by item 48. (In the alternative process following the dotted line all the water removal is effected at 48 and stream 50 is larger). At 50 the water contains dissolved carbon dioxide but with simple purification can be fed to point 42. At 52 the carbon dioxide can be expanded in an engine to recover energy. After unit 48 the gas contains residual CO and $CO_2$, and these are made harmless by preheating the gas and reacting it over a supported nickel catalyst in methanation reactor 54. The gas is then cooled, largely freed of water in catchpot 56 and thoroughly dried in regenerable adsorption unit 60. Water taken at 58 from catchpot 56 can be used at point 42.

The dried gas is compressed at 62, mixed at 64 with recycle gas to be described, heated to synthesis inlet temperature and fed to reactor 66 (this reactor is shown with a single catalyst bed but in practice would include a plurality of beds and conventional means for feed gas preheating and temperature control. It is, however, preferred in any event to have feed gas preheater 67 upstream of part of the catalyst, so that hot gas from the downstream-most bed can pass to external heat recovery 68 without cooling). After heat recovery 68 the gas is cooled by conventional means (not shown) including moderate refrigeration, to below the dewpoint to ammonia and passed to catchpot 70 from which liquid product ammonia is run off at 72. Unreacted gas passes out overhead; at this stage is contains less hydrogen per nitrogen molecule than the gas fed to reactor 66, because ammonia formation removes 3 hydrogen molecules per nitrogen molecule, but at 74 it receives a feed of hydrogen-rich gas to be described below. The mixed gas is fed to circulator 76, which increases its pressure by up to 20% and is then divided at 78 into a synthesis recycle stream (which is fed to point 64) and a hydrogen recovery stream. This stream is fed to separation section 80. Here it is washed with water to remove ammonia and dried. Part of the dried gas is taken off at 81 to regenerate absorber 60, the remainder of the gas is resolved cryogenically or by adsorption or selective diffusion into the hydrogen-rich stream 82 fed to point 74 and a waste stream 86, which may have fuel value. The aqueous ammonia is distilled under pressure and the resulting anhydrous ammonia is fed out at 84 to the main product offtake 72.

Table 1 sets out the process conditions, gas compositions and hourly flow rates in a process for making 775 metric tons per day of ammonia from a natural gas of average composition $CH_{3.931}$ containing 2.4% v/v of nitrogen and 0.1% v/v of $CO_2$. This process follows the dotted paths on the flowsheet.

During operation of the process, nitrogen, as liquid or compressed gas, accumulates in reservoir 28. Should the plant have to be shut down, this nitrogen (after evaporation if it is in liquid form) is piped by lines (indicated by 29 generally) to the inlets of catalytic reactors. Such nitrogen can be cold or, if a short shut down period is expected, can be preheated to catalyst operating temperature. Nitrogen flow is maintained until process gases have been displaced. If the plant is to be restarted from cold, nitrogen from 29 is preheated and passed through, whereafter burners 20 are lit and the various reactors are brought up to operating temperature. Such nitrogen flow can be on a once through or recycle basis depending on the capacity of reservoir 28.

In the process of FIG. 2 natural gas is desulphurised by known means (not shown) and fed at 110 to the lower portion of packed tower 112, in which it rises through a falling stream of hot water fed in at 114 from a source to be described. The resulting water-saturated gas is mixed, if necessary, with steam at 116. (In an alternative process, shown by the dotted lines, tower 112 and corresponding desaturator tower 139 are not used and all the steam is added as such at 116). The mixture is preheated in the convective section of furnace 118 fired at 120 with synthesis residual gas 86 and natural gas 111, which for this purpose need not be thoroughly, if at all, desulphurised. The heated gas is then passed over a supported nickel catalyst in heated tubes 122. The endothermic methane/steam reaction $$CH_4 + H_2O \rightarrow CO + 3H_2$$

takes place, the temperature reaching 629° C. at the catalyst outlet. The resulting gas is passed into secondary reformer 130. Here it encounters a stream of hot air (700° C.) fed in at 132. The temperature rises initially as hydrogen burns with a flame, but over the catalyst further methane/stream reaction takes place and the temperature falls to 857° C. at the catalyst bed outlet. The temperature and rate of feed of air are chosen so that the gas leaving 130 contains nitrogen in excess of what can react later with hydrogen to produce ammonia. It also contains methane to an extent that would normally be regarded as excessive in ammonia synthesis gas: this is preferred because the feedstock economy due to more complete methane reaction would entail extra energy consumption in compressing air and in removing nitrogen later or, alternatively or additionally, would require higher fuel consumption in furnace 118. Furnace 118 includes also flue gas heat recoveries such as combustion air preheaters and boiler feed water heaters but for the sake of clarity these are not shown.

TABLE 1

| Position FIG. 1 | Temp °C. | Pressure bar abs | CO | CO₂ | H₂ | CH₄ | Ar | N₂ | O₂ | NH₃ | H₂O | Flow Rate kg mol h⁻¹ |
|---|---|---|---|---|---|---|---|---|---|---|---|---|
| 22 inlet | 640 | 35.6 | — | — | 0.55 | 24.76* | — | 0.31 | — | — | 74.3 | 4152.3 |
| 22 outlet | 523 | 35.0 | | | | | | | | | | |
| | | | 0.13 | 2.93 | 11.53 | 20.50 | — | 0.30 | — | — | 64.62 | 4378.5 |
| 30 inlet | 700 | 35.0 | | | | | | | | | | |
| | 600 | 40.0 | — | 0.03 | — | — | 0.79 | 67.18 | 32.0 | — | — | 1577.5 |
| 30 outlet | 924 | 32.9 | | | | | | | | | | |
| | | | 7.84 | 6.59 | 33.47 | 0.43 | 0.17 | 14.93 | — | — | 37.07 | 7184.5 |
| 35 inlet | 370 | 32.9 | | | | | | | | | | |
| 35 outlet | | 32.3 | | | | | | | | | | |
| | | | 1.93 | 11.98 | 39.36 | 0.43 | 0.17 | 14.93 | — | — | 31.18 | 7184.5 |
| 37 inlet | 210 | 32.3 | | | | | | | | | | |
| 37 outlet | 229 | 31.9 | 0.17 | 13.76 | 41.13 | 0.43 | 0.17 | 14.93 | — | — | 29.40 | 7184.5 |
| 54 inlet | 300 | 31.9 | 0.30 | 0.10 | 72.29 | 0.75 | 0.31 | 26.24 | — | — | — | 4087.7 |
| 60 outlet | 35 | 30.9 | | | | | | | | | | |
| | | | — | — | 71.92 | 1.18 | 0.31 | 26.59 | — | — | — | 4002.2 |
| 62 outlet | | 85 | | | | | | | | | | |
| 66 inlet | 249 | 87.7 | — | — | 65.55 | 6.68 | 2.07 | 21.89 | — | 3.81 | — | 21609 |
| 66 outlet | 395 | | | | | | | | | | | |
| | | 85.6 | — | — | 57.42 | 7.33 | 2.27 | 19.19 | — | 13.80 | — | 19713 |
| 70 inlet | −10 | | | | | | | | | | | |
| 70 overhead | −10 | 85.6 | — | — | 63.39 | 8.08 | 2.50 | 21.13 | — | 4.85 | — | 17850.0 |
| 70 bottoms | −10 | 85.6 | — | — | 0.23 | 0.14 | 0.02 | 0.09 | — | 99.52 | — | 1863.2 |
| 76 inlet | 29 | 83.5 | | | | | | | | | | |
| | | | — | — | 63.34 | 6.68 | 2.07 | 21.89 | — | 3.81 | — | 22712 |
| 80 inlet | 36 | 88.5 | | | | | | | | | | |
| 82 | | | — | — | 91.43 | 0.33 | 0.43 | 7.82 | — | — | — | |
| 84 | | | — | — | — | — | — | — | — | 100— | — | 42.1 |
| 86 | | | — | — | 14.80 | 22.12 | 6.08 | 57.02 | — | — | — | 200.7 |

*At this position but not thereafter the percentage under "CH₄" in fact relates to the natural gas hydrocarbon of average composition $CH_{3.931}$.

Gas leaving secondary reformer 130 is cooled at 134, which represents heat recovery by high pressure steam generation and one or more of boiler feed water heating and natural gas preheating. The cooled gas, now at about 300° C., is passed into shift reactor 136 and there it reacts exothermically over a copper-containing catalyst and becomes heated at 335° C. The gas is cooled with heat recovery in boiler 137. It is contacted with water in packed tower 139 and there cooled and depleted of part of its content of steam. The resulting heated water is passed at 114 into tower 112 already mentioned. The cool water fed to tower 138 at 140 is derived in part from tower 112 in which heated water from the bottom of tower 138 is cooled by evaporation and partly from supplementary water fed in at 142 from external supplies or from point 150 or 158 to be described.

Water-depleted gas leaving tower 138 overhead is reacted with air fed at 146 over a noble metal catalyst in selective oxidation unit 144. (In the alternative process following the dotted line item 137 includes also further cooling and water removal). The CO-free gas leaving 144 is passed to cooling, water-removal and $CO_2$-removal units, which are conventional and are indicated generally by item 148. At 150 the water contains dissolved carbon dioxide but with simple purification can be fed to point 142. Carbon dioxide passed out at 152 can be expanded in an engine to recover energy. After unit 148 the gas contains residual $CO_2$, and this is made harmless by preheating the gas and reacting it over a supported nickel catalyst in methanation reactor 154. The gas is then cooled, largely freed of water in catchpot 156, thoroughly dried by adsorption in unit 160 and fed to compressor 162. Water taken at 158 from catchpot 156 can be used at point 142.

The ammonia synthesis section flowsheet, items 64–86, is the same as in FIG. 1. Stream 86, however, is substantially larger than in the process of FIG. 1 and is fed to the burners of furnace 118 as a significant part of its fuel supply.

Table 2 sets out the process conditions, gas compositions and hourly flow rates in a process for making 1000 metric tons per day of ammonia from a natural gas of average composition $CH_{3.88}$ containing 2.4% v/v of nitrogen and 0.1% v/v of $CO_2$. This process follows the dotted paths on the flowsheet. The purged residual stream 86 used to fuel furnace 118 contains methane flowing at 146.4 kg mol $h^{-1}$, which is 10% by carbon atoms of the hydrocarbon fed to primary reforming at point 110.

TABLE 2

| Position FIG. 2 | Temp °C. | Pressure bar abs | Gas composition % by mols | | | | | | | | | Flow Rate kg mol $h^{-1}$ |
|---|---|---|---|---|---|---|---|---|---|---|---|---|
| | | | CO | $CO_2$ | $H_2$ | $CH_4$ | Ar | $N_2$ | $O_2$ | $NH_3$ | $H_2O$ | |
| 122 inlet | 540 | 51.27 | — | 0.02 | — | 16.59* | — | 0.38 | — | — | 83.01 | 8476 |
| 122 outlet | 629 | 50.46 | 0.52 | 4.27 | 17.63 | 10.39 | — | 0.35 | — | — | 66.85 | 9275 |
| 130 inlet | 700 | 50.46 | 0.52 | 4.27 | 17.63 | 10.39 | — | 0.35 | — | — | 66.85 | 9275 |
| | 700 | 55.22 | — | 0.03 | — | — | 0.92 | 78.06 | 20.99 | — | — | 2401 |
| 130 outlet | 857 | 49.85 | 3.95 | 5.92 | 26.89 | 1.13 | 0.17 | 14.89 | — | — | 47.06 | 12809 |
| 136 inlet | 300 | | | | | | | | | | | |
| 136 outlet | 335.5 | 49.25 | 0.35 | 9.51 | 30.49 | 1.13 | 0.17 | 14.89 | — | — | 43.46 | 12809 |
| 144 outlet | 35 | 49.25 | — | 9.80 | 30.29 | 1.12 | 0.18 | 15.44 | — | — | 43.17 | 12894 |
| 154 inlet | 300 | 49.25 | — | 0.05 | 64.28 | 2.38 | 0.38 | 32.76 | — | — | 0.17 | 6075 |
| 160 outlet | 35 | 48.23 | — | — | 64.3 | 2.44 | 0.38 | 32.87 | — | — | — | 6054 |
| 162 outlet | 136 | 100.72 | | | | | | | | | | |
| 66 inlet | 295 | 100.00 | — | — | 61.79 | 3.84 | 1.57 | 28.1 | — | 4.7 | — | 30157 |
| 66 outlet | 438 | 93.02 | — | — | 54.00 | 4.18 | 1.71 | 26.15 | — | 13.96 | — | 27706 |
| 70 inlet | −1.0 | 90.50 | | | | | | | | | | |
| 70 overhead | −1.08 | 89.98 | — | — | 58.76 | 4.54 | 1.86 | 28.46 | — | 6.37 | — | 25447 |
| 70 bottoms | −1.08 | 89.98 | — | — | 0.27 | 0.09 | 0.02 | 0.15 | — | 99.47 | — | 2258 |
| 76 inlet | 24.77 | 89.88 | — | — | 61.16 | 4.19 | 1.87 | 26.89 | — | 5.88 | — | 27566 |
| 80 inlet | 38.0 | 100.72 | | | | | | | | | | 3463 |
| 82 | 20 | 89.88 | — | — | 90.0 | — | 2.0 | 8.0 | — | — | — | 2118 |
| 84 | — | — | — | — | — | — | — | — | — | 100 | — | 194 |
| 86 | 5.4 | 4.76 | — | — | 18.85 | 12.72 | 1.98 | 66.44 | — | — | — | 1151 |

*At this position but not thereafter the percentage under "$CH_4$" in fact relates to the natural gas hydrocarbon of average composition $CH_{3.88}$.

I claim:

1. An ammonia production process which comprises the steps of:
   (a) primary catalytically reforming a hydrocarbon feedstock with steam over an externally heated catalyst at superatmospheric pressure and in conditions of steam-to-carbon ratio, pressure and temperature to produce a gas containing carbon oxides, hydrogen, and at least 10% v/v of methane on a dry basis;
   (b) secondary catalytically reforming the gas from step (a) by introducing air and bringing the mixture towards equilibrium, whereby to produce a gas containing nitrogen, carbon oxides, hydrogen and a decreased quantity of methane;
   (c) converting carbon monoxide catalytically with steam to carbon dioxide and hydrogen;
   (d) removing carbon oxides to give fresh nitrogen-hydrogen ammonia synthesis gas, the quantity of air used in step (b) being such that the fresh ammonia synthesis gas contains more than 1 molecule of nitrogen per 3 molecules of hydrogen;
   (e) adding to the fresh ammonia synthesis gas recycle gas including a stream enriched in hydrogen, the rate of flow of said stream enriched in hydrogen being such that the mixture of the fresh ammonia synthesis gas and the recycle gas has a hydrogen to nitrogen molar ratio in the range 1.0 to 2.5;
   (f) passing the mixture of the fresh synthesis gas and recycle gas over a synthesis catalyst to produce reacted gas containing ammonia and recovering ammonia from the reacted gas, recycling part of the reacted gas after recovery of ammonia therefrom as part of said recycle gas;

(g) from the remainder of said reacted gas separating a stream enriched in hydrogen leaving a residual stream, returning the enriched stream to the synthesis as the remainder of said recycle gas; and (h) using the residual stream as fuel to supply heat to the externally heated catalyst in step (a), step (b) being operated under such conditions that the outlet methane content from step (b) is such that the residual stream contains methane amounting to 5–15% by carbon atoms of the hydrocarbon feedstock fed to step (a).

2. A process according to claim 1 in which in the gas leaving step (a) the methane content 25–35% and in the gas leaving step (b) the methane content is 1.5 to 3%, both v/v on a dry basis.

3. A process according to claim 3 in which step (a) is operated at an outlet temperature in the range 550°–650° C.

4. A process according to claim 3 in which step (b) is operated at an outlet temperature not over 900° C.

5. A process according to claim 1 in which steps (a) to (d) are operated at an outlet pressure in the range 30–80 bar abs, and the fresh ammonia synthesis gas is compressed by not more than 80 bar after step (d).

6. An ammonia production process which comprises the steps of:

(i) passing a mixture of fresh synthesis gas and recycle gas over a synthesis catalyst to produce reacted gas containing ammonia and recovering ammonia from the reacted gas;

(ii) recycling part of the reacted gas after recovery of ammonia therefrom as part of said recycle gas;

(iii) from the remainder of said reacted gas separating a stream enriched in hydrogen leaving a residual stream;

(iv) returning the enriched stream to the synthesis as the remainder of said recycle gas, the rate of flow of said stream enriched in hydrogen being such that the mixture of the fresh ammonia synthesis gas and the recycle gas has a hydrogen to nitrogen molar ratio in the range 1.0 to 2.5;

said fresh synthesis gas being produced by:

(a) primary catalytically reforming a hydrocarbon feedstock with steam over an externally heated catalyst at superatmospheric pressure and in conditions of steam-to-carbon ratio, pressure and temperature to produce a primary reformed gas containing carbon oxides, hydrogen, and at least 10% v/v of methane on a dry basis, said residual gas being used as fuel to heat said catalyst;

(b) secondary catalytically reforming the primary reformed gas by introducing air and bringing the mixture towards equilibrium, whereby to produce a secondary reformed gas containing nitrogen, carbon oxides, hydrogen and a decreased quantity of methane, the quantity of air being in excess of what would introduce 1 molecule of nitrogen per 3 molecules of hydrogen into the fresh ammonia synthesis gas, and the conditions being such that the methane content of the secondary reformed gas is such that said residual gas contents methane amounting to 5–15% by carbon atoms of the hydrocarbon feedstock fed to the primary reforming step; and (c) converting carbon monoxide in the secondary reformed gas catalytically with steam to carbon dioxide and hydrogen, and then removing carbon oxides.

7. A process according to claim 6 in which steps (a) to (c) are operated at an outlet pressure in the range 30–80 bar abs, and the fresh ammonia synthesis gas is compressed by not more than 80 bar after step (c).

* * * * *